(12) United States Patent
Kim et al.

(10) Patent No.: US 11,335,106 B2
(45) Date of Patent: May 17, 2022

(54) METHODS AND APPARATUS TO CONVERT IMAGES FOR COMPUTER-VISION SYSTEMS

(71) Applicant: Intel Corporation, Santa Clara, CA (US)

(72) Inventors: Tae-Hoon Kim, Seoul (KR); Minje Park, Seoul (KR)

(73) Assignee: INTEL CORPORATION, Santa Clara, CA (US)

(*) Notice: Subject to any disclaimer, the term of this patent is extended or adjusted under 35 U.S.C. 154(b) by 30 days.

(21) Appl. No.: 16/649,566

(22) PCT Filed: Nov. 29, 2017

(86) PCT No.: PCT/US2017/063585
§ 371 (c)(1),
(2) Date: Mar. 20, 2020

(87) PCT Pub. No.: WO2019/108170
PCT Pub. Date: Jun. 6, 2019

(65) Prior Publication Data
US 2020/0242355 A1    Jul. 30, 2020

(51) Int. Cl.
*G06K 9/00* (2022.01)
*G06V 20/80* (2022.01)
*G06K 9/62* (2022.01)
*G06N 3/04* (2006.01)
*G06N 3/08* (2006.01)
*G06V 10/143* (2022.01)

(52) U.S. Cl.
CPC ........... *G06V 20/80* (2022.01); *G06K 9/6256* (2013.01); *G06K 9/6262* (2013.01);
(Continued)

(58) Field of Classification Search
CPC ............. G06K 9/00577; G06K 9/2018; G06K 9/6256; G06K 9/6262; G06K 9/6271;
(Continued)

(56) References Cited

U.S. PATENT DOCUMENTS 6,476,391 B1    11/2002  Zhang
2013/0250123 A1  9/2013  Zhang et al.
(Continued)

FOREIGN PATENT DOCUMENTS

KR    10-1502143    3/2015

OTHER PUBLICATIONS

Ledig et al., "Photo-Realistic Single Image Super-Resolution Using a Generative Adversarial Network," IEEE Conference on Computer Vision and Pattern Recognition, 2017, 19 pages.
(Continued)

*Primary Examiner* — Juan A Torres
(74) *Attorney, Agent, or Firm* — Hanley, Flight & Zimmerman LLC (57) ABSTRACT

An example computer-vision system to convert images includes an image converter (112) to convert a near infrared light first image (202) to form a visible light image (206), and to update a coefficient of the image converter (112) based on a difference (214), an object recognizer (102) to recognize an object (208) in the first visible light image (206), and an object recognition analyzer (210) to determine the difference (214) between the object (208) recognized in the first visible light image (206) and an object (212) associated with the near infrared light image (202).

25 Claims, 6 Drawing Sheets

(52) U.S. Cl.
CPC ............. *G06N 3/0454* (2013.01); *G06N 3/08* (2013.01); *G06V 10/143* (2022.01); *G06N 3/0481* (2013.01)

(58) Field of Classification Search
CPC ...... G06K 9/4628; G06N 3/0454; G06N 3/08; G06N 3/0481; G06N 3/0472; G06T 1/20
USPC ........................................................ 382/103
See application file for complete search history.

(56) References Cited

U.S. PATENT DOCUMENTS

2014/0355861 A1   12/2014  Nirenberg et al.
2017/0132512 A1*   5/2017  Ioffe ........................ G06N 3/08

OTHER PUBLICATIONS

Iizuka et al., "Let there be Color! Joint End-to-End Learning of Global and Local Image Priors for Automatic Image Colorization with Simultaneous Classification," ACM Transactions on Graphics, 2016, 11 pages.
International Searching Authority, "International Search Report," mailed in connection with International Patent Application No. PCT/US2017/063585, dated Aug. 28, 2018, 3 pages.
International Searching Authority, "Written Opinion," mailed in connection with International Patent Application No. PCT/US2017/063585, dated Aug. 28, 2018, 9 pages.
Inkyu SA et al., "DeepFruits: A Fruit Detection System Using Deep Neural Networks," Sensors, 16(8), Aug. 2016, 23.

* cited by examiner

METHODS AND APPARATUS TO CONVERT IMAGES FOR COMPUTER-VISION SYSTEMS

CROSS-REFERENCE TO RELATED APPLICATION

This patent arises from a 371 Nationalization of International Patent Application Serial No. PCT/US17/63585, which is entitled "METHODS AND APPARATUS TO CONVERT IMAGES FOR COMPUTER-VISION SYSTEMS," and which was filed on Nov. 29, 2017, the subject matter of which is expressly incorporated herein by reference in its entirety.

FIELD OF THE DISCLOSURE

This disclosure relates generally to images, and, more particularly, to methods and apparatus to convert images for computer-vision systems.

BACKGROUND

Computer-vision includes acquiring, processing, analyzing and understanding digital images to extract data representative of the physical world that can, for example, be used to make decisions, take actions, etc.

The figures are not to scale. Wherever possible, the same reference numbers will be used throughout the drawing(s) and accompanying written description to refer to the same or like parts. Connecting lines or connectors shown in the various figures presented are intended to represent example functional relationships and/or physical or logical couplings between the various elements.

DETAILED DESCRIPTION

Prevalent computer-vision techniques use light in the visible light spectrum (e.g., light having wavelengths in the 400-700 nanometer (nm) range) to classify (e.g., identify, recognize, etc.) features (e.g., objects, items, aspects, things, elements, etc.) in an image. Other spectra, such as near infrared (NIR) (light having wavelengths in the 700-1200 nm range), have been used for special purposes such as depth estimation and ultra-low light conditions. More recently, increasing interest in the Internet of Things (IoT) has created an increasing need for computer-vision systems that support multi-spectrum imaging, and are robust to illumination level (e.g., work in very low light level conditions). Most image and/or video datastores available today for training computer-vision algorithms were collected using red-green-blue (RGB) and/or grayscale cameras and, thus, aren't applicable to training computer-vision systems that utilize other light spectra (e.g., NIR). Moreover, visible light computer-vision systems do not perform well in low light level conditions. Thus, existing technologies and existing datastores cannot be used to implement computer-vision systems that satisfy the needs of new technologies such as the IoT.

Reference will now be made in detail to non-limiting examples of this disclosure, examples of which are illustrated in the accompanying drawings. The examples are described below by referring to the drawings.

Figure 1:
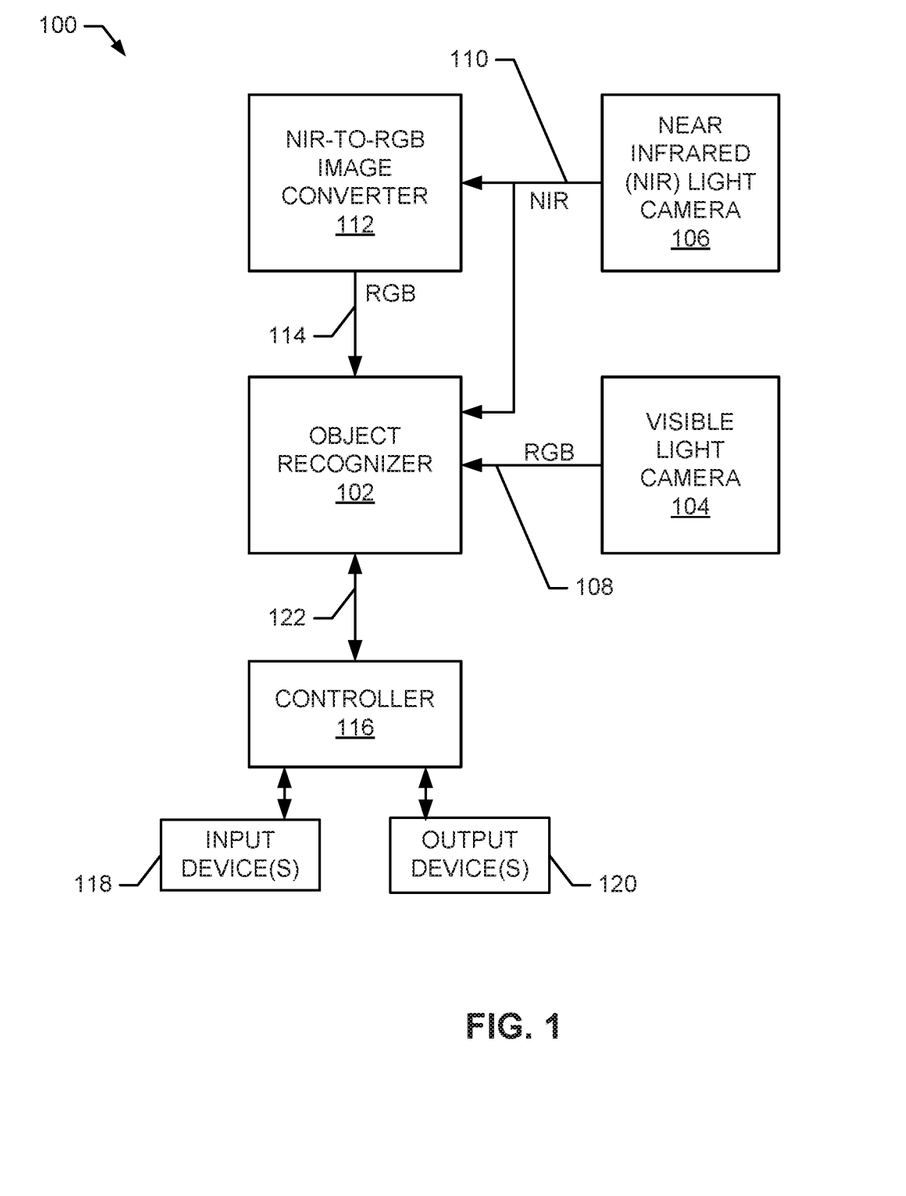
FIG. 1 is a block diagram of an example computer-vision system including an image converter in accordance with this disclosure.

FIG. 1 is a block diagram of an example computer-vision system 100 in accordance with this disclosure. To perform object recognition, the example computer-vision system 100 of FIG. 1 includes an example object recognizer 102. The example object recognizer 102 of FIG. 1 recognizes objects in images by, for example, performing object recognition, object detection, object identification, object classification, feature recognition, feature detection, feature identification, feature classification, etc. The object recognizer 102 uses any number and/or type(s) of method(s), algorithm(s), technique(s), circuit(s), etc. to recognize objects in images. In some examples, the object recognizer 102 is implemented as a machine learning engine in the form of, for example, a neural network.

To capture images on which, for example, the example object recognizer 102 can perform object recognition, the example computer-vision system 100 of FIG. 1 includes, and/or is communicatively coupled to, one or more example image capture devices. In the illustrated example of FIG. 1, the computer-vision system 100 includes an example visible light camera 104 and an example NIR light camera 106. In some examples, the visible light camera 104 captures images 108 using an RGB color format, a grayscale format, however, other color formats may be used. In some examples, the NIR light camera 106 captures NIR images 110 using a color format including a single color channel in the NIR light spectrum. In some examples, the object recognizer 102 selects between the RGB images 108 and the NIR images 110 based on light level. For example, the object recognizer 102 selects the NIR images 110 in low light conditions and, otherwise, selects the RGB images 108.

To convert between images having different formats, the example computer-vision system 100 of FIG. 1 includes one or more example image converters. For example, the illustrated example of FIG. 1 includes an example NIR-to-RGB image converter 112. The example NIR-to-RGB image converter 112 converts the NIR images 110 to the RGB images 114. For example, in low light conditions the object recognizer 102 can select the NIR images 110, assuming the object recognizer 102 can process NIR images, and/or the RGB images 114 formed by the example NIR-to-RGB image converter 112. Thus, compared to other computer-vision systems, the example object recognizer 102 of FIG. 1 can perform object recognition in different lighting conditions and/or using different lighting spectra. Example implementations of the NIR-to-RGB image converter 112 are described below in connection with FIG. 6. In some examples, the NIR-to-RGB image converter 112 is implemented as a machine learning engine in the form of, for example, a neural network.

To control operations of the example computer-vision system 100, the example computer-vision system 100 includes an example controller 116, example input device(s) 118, and example output device(s) 120. In some examples, the controller 116, input device(s) 118, and example output device(s) 120 are implemented as part of a processor platform such as the example processor platform 700 of FIG. 7. Example input device(s) 118 and example output device(s) 120 include, but are not limited to, sensors, actuators, motors, etc. that, in connection with identified objects 122 made by the object recognizer 102, can sense an environment about the computer-vision system 100 and/or take action in the environment.

While an example computer-vision system 100 is illustrated in FIG. 1, one or more of the elements, processes and/or devices illustrated in FIG. 1 may be combined, divided, re-arranged, omitted, eliminated and/or implemented in any other way. Further, the example object recognizer 102, the example cameras 104 and 106, the example NIR-to-RGB image converter 112, the example controller 116, the example input device(s) 118, the example output device(s) 120 and/or, more generally, the example computer-vision system 100 of FIG. 1 may be implemented by hardware, software, firmware and/or any combination of hardware, software and/or firmware. Thus, for example, any of the example object recognizer 102, the example cameras 104 and 106, the example NIR-to-RGB image converter 112, the example controller 116, the example input device(s) 118, the example output device(s) 120 and/or, more generally, the example computer-vision system 100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable gate array(s) (FPGA(s)), and/or field programmable logic device(s) (FPLD(s)). When reading any of the apparatus or system claims of this patent to cover a purely software and/or firmware implementation, at least one of the example object recognizer 102, the example cameras 104 and 106, the example NIR-to-RGB image converter 112, the example controller 116, the example input device(s) 118, the example output device(s) 120 and/or the example computer-vision system 100 is/are hereby expressly defined to include a non-transitory computer readable storage device or storage disk such as a memory, a digital versatile disk (DVD), a compact disk (CD), a Blu-ray disk, etc. including the software and/or firmware. Further still, the example computer-vision system 100 of FIG. 1 may include one or more elements, processes and/or devices in addition to, or instead of, those illustrated in FIG. 1, and/or may include more than one of any or all the illustrated elements, processes and devices.

Figure 2:
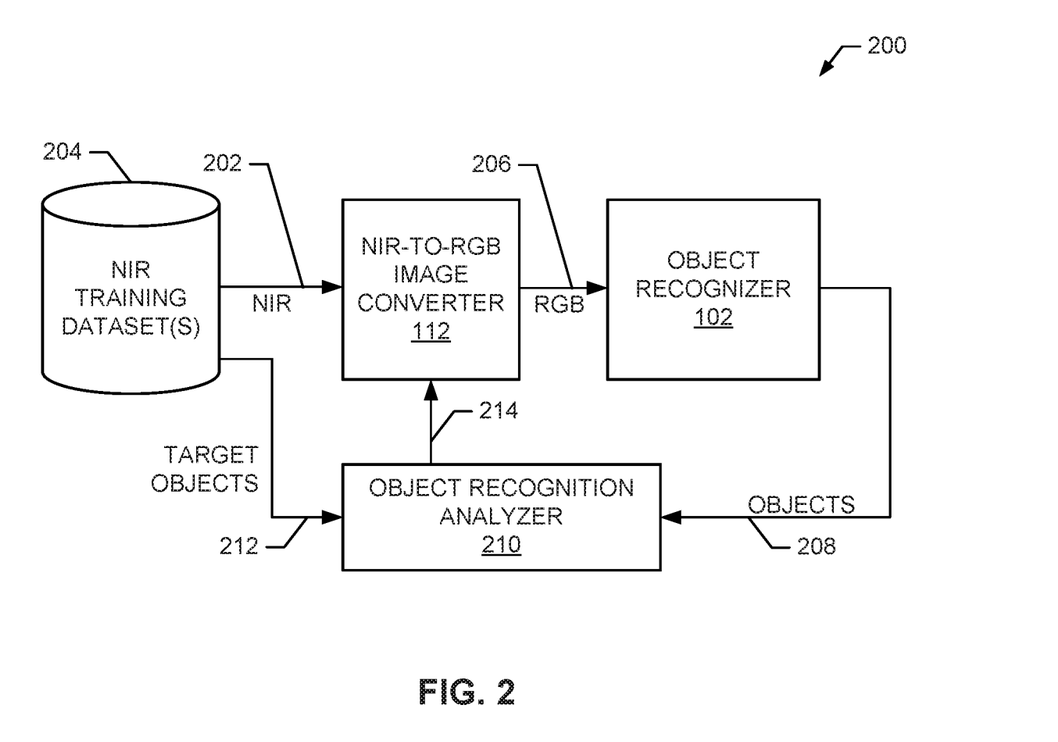
FIG. 2 is a block diagram of an example system to train the example image converter of FIG. 1.

FIG. 2 is a block diagram of an example system 200 in accordance with this disclosure to train image converters such as the example image converter 112 of FIG. 1. In the illustrated example of FIG. 2, the example NIR-to-RGB image converter 112 converts NIR images 202 from a training dataset(s) of NIR images 204 to RGB images 206, and the object recognizer 102 performs object recognition to identify objects 208 in the RGB images 206.

To analyze the object recognition accuracy of the combination of the example NIR-to-RGB image converter 112 and the example object recognizer 102 shown in FIG. 2, the example system 200 includes an example object recognition analyzer 210. The example object recognition analyzer 210 compares the objects 208 recognized by the object recognizer 102 with target objects 212 associated a priori with the NIR images 202. Differences 214 between the objects 208 and the target objects 212 are used to update one or more coefficients of the NIR-to-RGB image converter 112. For example, when a machine learning engine, such as a neural network, is used to implement the NIR-to-RGB image converter 112, the differences 214 can be used to perform supervised learning of the NIR-to-RGB image converter 112. Alternatively, if the target objects 212 are not available, the objects 208 can be used to perform unsupervised learning of the NIR-to-RGB image converter 112. The differences 214 can be determined by or expressed using, for example, mean squared errors, L2-distances, etc.

While an example manner of implementing an example system 200 to train image converters, such as the example NIR-to-RGB image converter 112, is illustrated in FIG. 2, one or more of the elements, processes and/or devices illustrated in FIG. 2 may be combined, divided, re-arranged, omitted, eliminated and/or implemented in any other way. Further, the example training dataset(s) of NIR images 204, the example object recognition analyzer 210 and/or, more generally, the example system 200 of FIG. 2 may be implemented by hardware, software, firmware and/or any combination of hardware, software and/or firmware. Thus, for example, any of the example training dataset(s) of NIR images 204, the example object recognition analyzer 210 and/or, more generally, the example system 200 could be implemented by one or more analog or digital circuit(s), logic circuits, programmable processor(s), programmable controller(s), GPU(s), DSP(s), ASIC(s), PLD(s), FPGA(s), and/or FPLD(s). When reading any of the apparatus or system claims of this patent to cover a purely software and/or firmware implementation, at least one of the example training dataset(s) of NIR images 204, the example object recognition analyzer 210, and/or the example system 200 is/are hereby expressly defined to include a non-transitory computer readable storage device or storage disk such as a memory, a DVD, a CD, a Blu-ray disk, etc. including the software and/or firmware. Further still, the example system 200 of FIG. 2 may include one or more elements, processes and/or devices in addition to, or instead of, those illustrated in FIG. 2, and/or may include more than one of any or all the illustrated elements, processes and devices.

Figure 3:
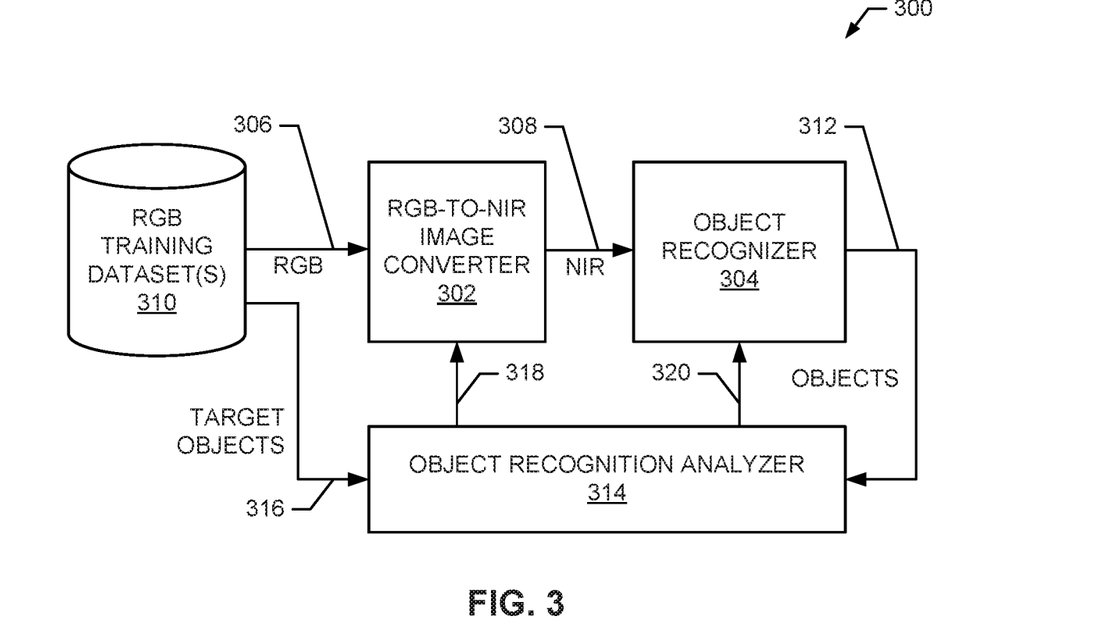
FIG. 3 is a block diagram of an example system to train an example image converter and an example object recognizer.

FIG. 3 is a block diagram of an example system 300, in accordance with this disclosure, to train an example RGB-to-NIR image converter 302, and an example object recognizer 304. To convert RGB images 306 to NIR images 308, the example system 300 includes the example RGB-to-NIR image converter 302. To perform object recognition on the NIR images 308, the example system 300 includes the example object recognizer 304. In the illustrated example of FIG. 3, the example RGB-to-NIR image converter 302 converts the RGB images 306 from a training dataset(s) of RGB images 310 to the NIR images 308, and the NIR images 308 are used to train the object recognizer 304 to recognize objects 312 for NIR images 308. By including the RGB-to-NIR image converter 302, the object recognizer 304 can be trained to perform object recognition on NIR images even when a training dataset(s) of NIR images is not available. In some examples, the RGB-to-NIR image converter 302 is implemented as a machine learning engine in the form of, for example, a neural network. In some examples, the object recognizer 304 is implemented as a machine learning engine in the form of, for example, a neural network.

To analyze the object recognition accuracy of the combination of the example RGB-to-NIR image converter 302 and the example object recognizer 304 shown in FIG. 3, the example system 300 includes an example object recognition analyzer 314. The example object recognition analyzer 314 compares the objects 312 recognized by the object recognizer 304 with target objects 316 associated a priori with the RGB images 306. Differences 318 and/or 320 between the recognized objects 312 and the target objects 316 are used to update one or more coefficients of the RGB-to-NIR image converter 302, and/or one or more coefficients of the object recognizer 304. For example, when machine learning engines, such as a neural network, are used to implement the RGB-to-NIR image converter 302 and the object recognizer 304, the differences 318 and/or 320 can be used to perform supervised learning of the RGB-to-NIR image converter 302 and the object recognizer 304. Alternatively, if the target objects 316 are not available, the objects 312 can be used to perform unsupervised learning of the RGB-to-NIR image converter 302 and the object recognizer 304.

While an example manner of implementing an example system 300 to train image converters, such as the example RGB-to-NIR image converter 302, and/or an object recognizer, such as the example object recognizer 304, is illustrated in FIG. 3, one or more of the elements, processes and/or devices illustrated in FIG. 3 may be combined, divided, re-arranged, omitted, eliminated and/or implemented in any other way. Further, the RGB-to-NIR image converter 302, the object recognizer 304, the example training dataset(s) of RGB images 310, the example object recognition analyzer 314 and/or, more generally, the example system 300 of FIG. 3 may be implemented by hardware, software, firmware and/or any combination of hardware, software and/or firmware. Thus, for example, any of the RGB-to-NIR image converter 302, the object recognizer 304, the example training dataset(s) of RGB images 310, the example object recognition analyzer 314 and/or, more generally, the example system 300 could be implemented by one or more analog or digital circuit(s), logic circuits, programmable processor(s), programmable controller(s), GPU(s), DSP(s), ASIC(s), PLD(s), FPGA(s), and/or FPLD(s). When reading any of the apparatus or system claims of this patent to cover a purely software and/or firmware implementation, at least one of the RGB-to-NIR image converter 302, the object recognizer 304, the example training dataset(s) of RGB images 310, the example object recognition analyzer 314 and/or, more generally, the example system 300 is/are hereby expressly defined to include a non-transitory computer readable storage device or storage disk such as a memory, a DVD, a CD, a Blu-ray disk, etc. including the software and/or firmware. Further still, the example system 300 of FIG. 3 may include one or more elements, processes and/or devices in addition to, or instead of, those illustrated in FIG. 3, and/or may include more than one of any or all the illustrated elements, processes and devices.

Figure 4:
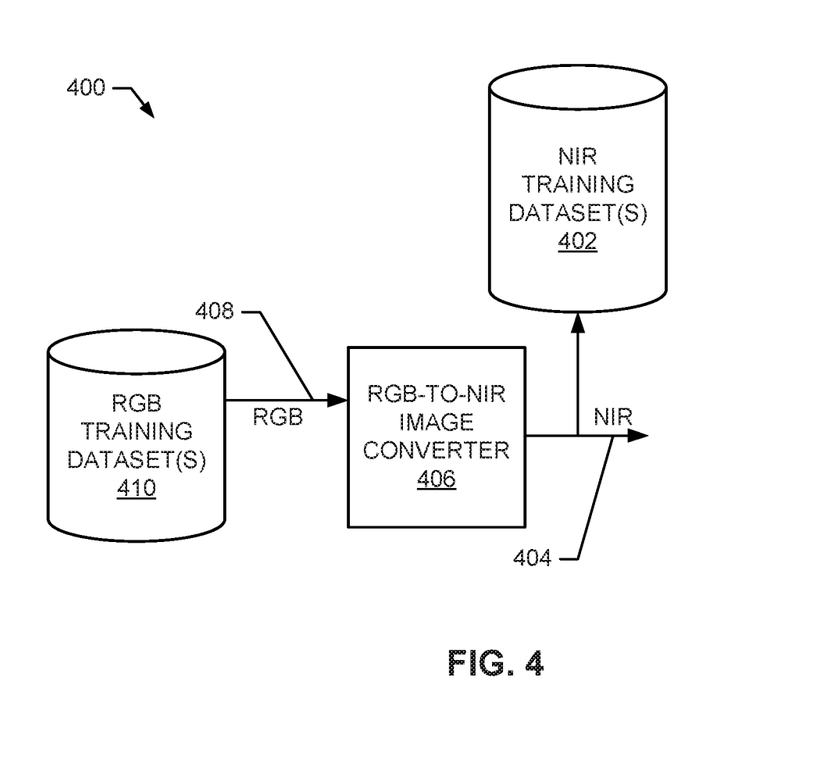
FIG. 4 is a block diagram of an example system to generate an example training dataset(s) of near infrared images.

FIG. 4 is a block diagram of an example system 400 to generate a training dataset(s) of NIR images 402. To form example NIR images 404 of the training dataset(s) of NIR images 402, the example system 400 includes an example RGB-to-NIR image converter 406. The example RGB-to-NIR image converter 406 of FIG. 4 converts RGB images 408 of a training dataset(s) of RGB images 410 to form the NIR images 404. The training dataset(s) of NIR images 402 can be subsequently used to train various aspects of a computer-vision system that uses NIR images. In some examples, the RGB-to-NIR image converter 406 is implemented as a machine learning engine in the form of, for example, a neural network. In some examples, the RGB-to-NIR image converter 406 is trained using the example system 300 of FIG. 3. The NIR images 404 may be stored in the example training dataset(s) of NIR images 402 using any number and/or type(s) of data structure(s). The example training dataset(s) of NIR images 402 may be stored on any number and/or type(s) of computer readable storage device or storage disk such as a memory, a DVD, a CD, a Blu-ray disk, etc.

Figure 5:
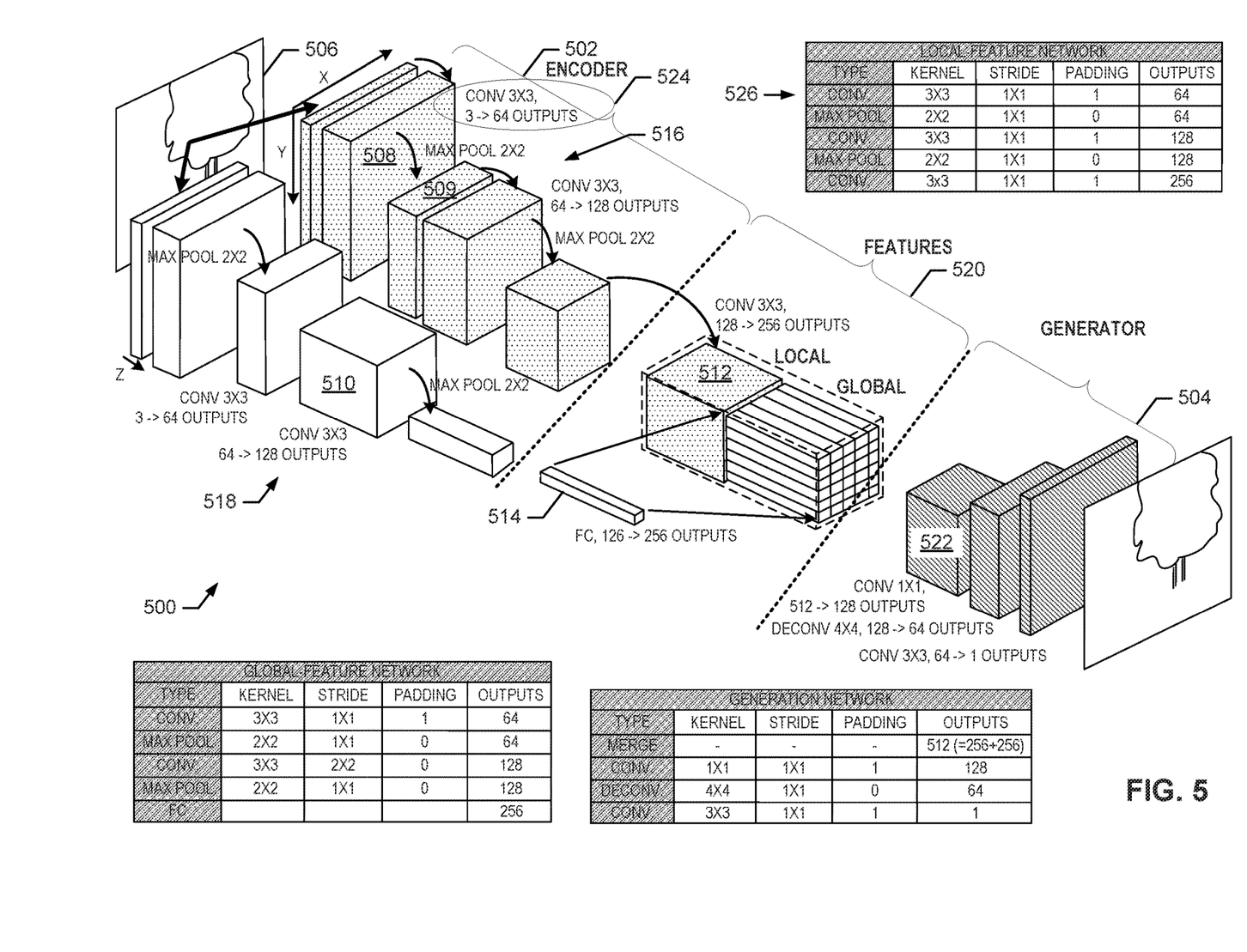
FIG. 5 is a block diagram of an example implementation of any of the example image converters of FIGS. 1-4.

FIG. 5 is a diagram of an example machine learning engine in the form of a deep convolutional neural network 500 that can be trained to recognize objects in images, and convert RGB images to NIR images, and vice versa. In the illustrated example of FIG. 5, the example neural network 500 is implemented using a conventional encoder—generator deep convolutional neural network architecture, however, other neural network models, architectures, etc. may be used. The example encoder—generator neural network 500 of FIG. 5 includes an example encoder portion 502, and an example generator (a.k.a. decoder) portion 504. Starting with an input image 506, data passes left-to-right through an ordered sequence of convolution, pooling, and activation layers (three of which are designated at reference numerals 508, 509 and 510). The encoder portion 502 extracts local features 512 and global features 514 of the input image 506 through two respective parallel sequences of the layers 516 and 518. The global features 514 represent overall, large, etc. features in the scene in the input image 506, and the local features 512 represent translation-invariant transforms of local patches of the input image 506.

In a middle portion 520 of the neural network 500, the global features 514 are replicated and combined to form a block having the same dimensions as the local features 512, and combined with the local features 512, as shown.

The example generator portion 504 of FIG. 5 includes an ordered sequence of deconvolution (a.k.a. transposed convolution), and activation layers (one of which is designated at reference numeral 522). The global features 514 guide the generator portion 504 to inference proper pixels for each region of the image 506 such as sky or human skin.

In FIG. 5, the layers 508-510 and 522 are annotated with example information regarding their operations. For example, layer 508 includes corresponding annotations 524 and 526. The example annotations 524 and 526 indicate that layer 508 is a convolutional layer using a 3×3 kernel, and a depth of 64.

While an example manner of implementing the example image converters 112, 302 and 406 is illustrated in FIG. 5, one or more of the elements, processes and/or devices illustrated in FIG. 5 may be combined, divided, re-arranged, omitted, eliminated and/or implemented in any other way. Further, the example layers 508-510 and 522, and/or, more generally, the example neural network 500 of FIG. 5 may be implemented by hardware, software, firmware and/or any combination of hardware, software and/or firmware. Thus, for example, any of the example layers 508-510 and 522, and/or, more generally, the example neural network 500 could be implemented by one or more analog or digital circuit(s), logic circuits, programmable processor(s), programmable controller(s), GPU(s), DSP(s), ASIC(s), PLD(s), FPGA(s), and/or FPLD(s). When reading any of the apparatus or system claims of this patent to cover a purely software and/or firmware implementation, at least one of the example, layers 508-510 and 522, and/or, more generally, the example neural network 500 is/are hereby expressly defined to include a non-transitory computer readable storage device or storage disk such as a memory, a DVD, a CD, a Blu-ray disk, etc. including the software and/or firmware. Further still, the example neural network 500 of FIG. 5 may include one or more elements, processes and/or devices in addition to, or instead of, those illustrated in FIG. 5, and/or may include more than one of any or all the illustrated elements, processes and devices.

Figure 6:
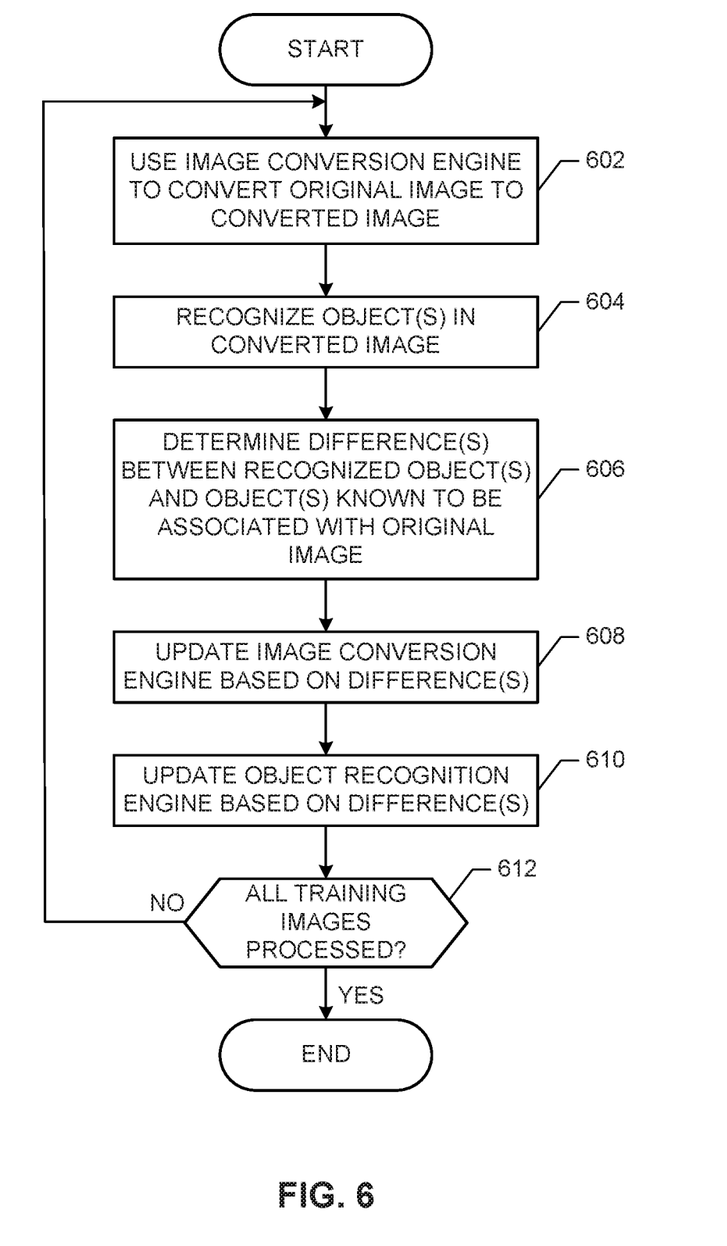
FIG. 6 is a flowchart representing example processes that may be implemented as machine-readable instructions that may be executed to implement the example systems of FIGS. 1-4.

A flowchart representative of example machine-readable instructions for implementing the systems 100, 200, 300 and 400 is shown in FIG. 6. In this example, the machine-readable instructions comprise a program for execution by a processor such as the processor 712 shown in the example processor platform 700 discussed below in connection with FIG. 7. The program may be embodied in software stored on a non-transitory computer readable storage medium such as a CD, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 6, many other methods of implementing the example systems 100, 200, 300 and 400 may alternatively be used. For example, the order of execution of the blocks may be changed, and/or some of the blocks described may be changed, eliminated, or combined. Additionally, and/or alternatively, any or all the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 6 may be implemented using coded instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

The program of FIG. 6 begins at block 602 with an original image being converted from one format to another (block 602). For example, the NIR-to-RGB image converter 112 converts an original NIR image 202 to an RGB image 206. Objects in the converted image are recognized (block 604). For example, the object recognizer 102 recognizes objects in the converted image 206. At block 606, differences between objects recognized in the converted image and objects known to be associated with the original image are determined. The image converter is updated based on the differences (block 608). For example, the differences are used as a supervised or an unsupervised updated into for the image converter. In some examples, the object recognizer is updated based on the differences (block 610). For example, the differences are used as a supervised or an unsupervised updated into for the object recognizer. When all training images have been processed (block 612), control exits from the example program of FIG. 6. Otherwise, control returns to block 602 to process the next training image.

Figure 7:
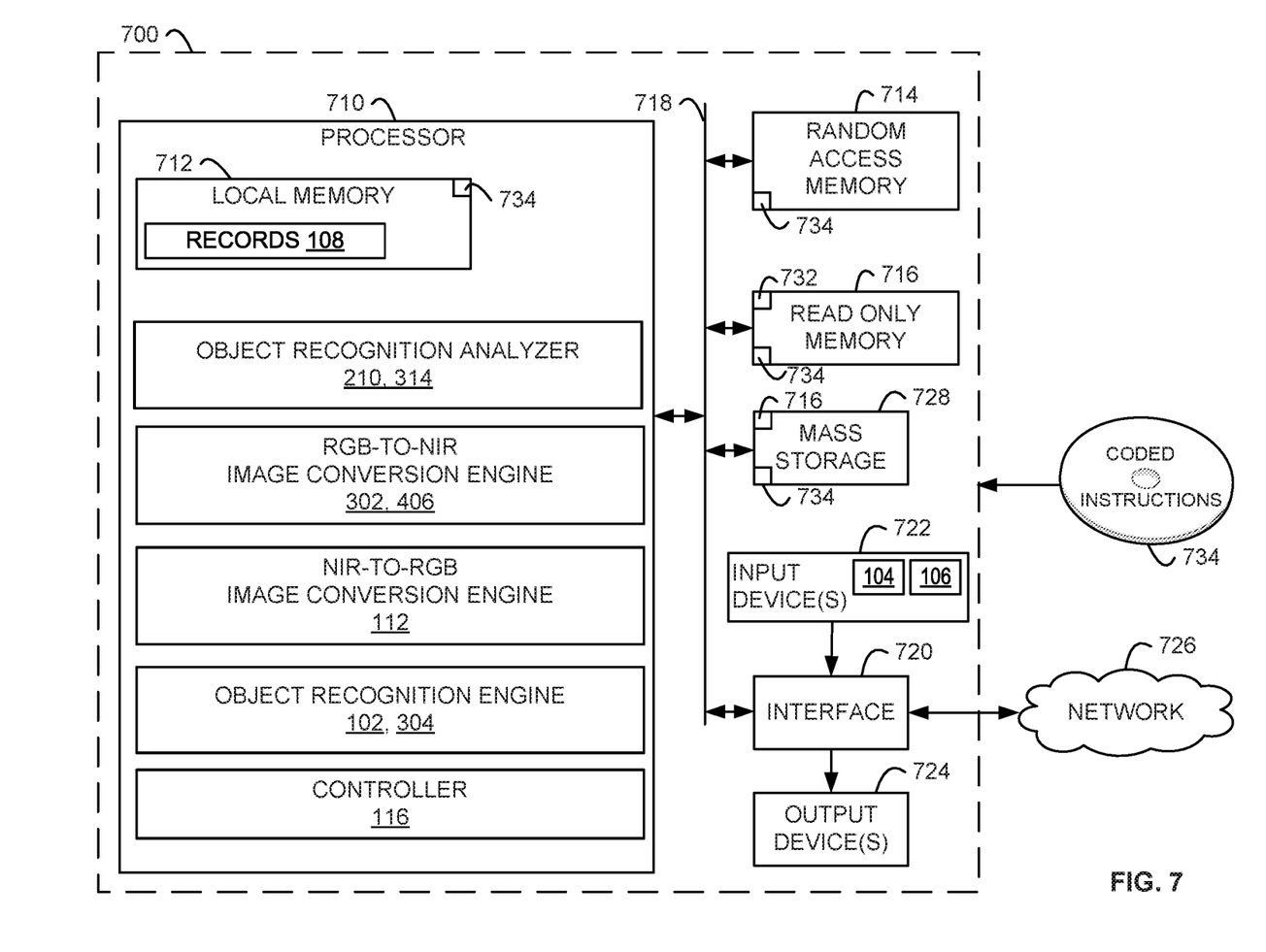
FIG. 7 illustrates an example processor platform structured to execute the example machine-readable instructions of FIG. 6 to implement the example systems of FIGS. 1-4.

FIG. 7 is a block diagram of an example processor platform 700 capable of executing the instructions of FIG. 6 to implement the systems 100, 200, 300 and 400 of FIGS. 1-4. The processor platform 700 can be, for example, a server, a personal computer, a workstation, a self-learning machine (e.g., a neural network), a mobile device (e.g., a cell phone, a smart phone, a tablet such as an IPAD™), a personal digital assistant (PDA), an Internet appliance, an Internet-of-Things (IoT) device, a headset, glasses, or other wearable device, a DVD player, a CD player, a digital video recorder, a Blu-ray player, a gaming console, a personal video recorder, a set top box, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs or controllers from any desired family or manufacturer. The hardware processor may be a semiconductor based (e.g., silicon based) device. In this example, the processor 710 implements the object recognizers 102 and 304, the image converters 112, 302 and 406, the controller 116, and the object recognition analyzer 210 and 314.

The processor 712 of the illustrated example includes a local memory 712 (e.g., a cache). The processor 712 of the illustrated example is in communication with a main memory including a volatile memory 714 and a non-volatile memory 716 via a bus 718. The volatile memory 714 may be implemented by Synchronous Dynamic Random-access Memory (SDRAM), Dynamic Random-access Memory (DRAM), RAMBUS® Dynamic Random-access Memory (RDRAM®) and/or any other type of random-access memory device. The non-volatile memory 716 may be implemented by flash memory and/or any other desired type of memory device. Access to the main memory 714, 716 is controlled by a memory controller (not shown).

The processor platform 700 of the illustrated example also includes an interface circuit 720. The interface circuit 720 may be implemented by any type of interface standard, such as an Ethernet interface, a universal serial bus (USB) interface, a Bluetooth® interface, a near field communication (NFC) interface, and/or a peripheral component interface (PCI) express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system. In this example, the input device(s) 722 implement the cameras 104 and 106.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-plane switching (IPS) display, a touchscreen, etc.) a tactile output device, a printer, and/or speakers. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, and/or a network interface to facilitate exchange of data with other machines (e.g., computing devices of any kind) via a network 726 (e.g., an Ethernet connection, a digital subscriber line (DSL), a telephone line, a coaxial cable, a cellular telephone system, a Wi-Fi system, etc.).

The processor platform 700 of the illustrated example also includes one or more mass storage devices 728 for storing software and/or data. Examples of such mass storage devices 728 include floppy disk drives, hard drive disks, CD drives, Blu-ray disk drives, redundant array of independent disks (RAID) systems, and DVD drives. In the illustrated example, the mass storage devices 728 and/or the read-only memory 716 stores the one or more training datasets of images 732 (e.g., one or more of the training datasets 204, 310, 402, 410).

Coded instructions 734 including the coded instructions of FIG. 6 may be stored in the mass storage device 728, in the volatile memory 714, in the non-volatile memory 716, and/or on a removable tangible computer readable storage medium such as a CD or DVD.

Example methods and apparatus to convert images for computer-vision systems are disclosed herein. Further examples and combinations thereof include at least the following.

Example 1 is a computer-vision system that includes:

an image converter to convert a near infrared light first image to form a visible light image, and to update a coefficient of the image converter based on a difference;

an object recognizer to recognize an object in the first visible light image; and an object recognition analyzer to determine the difference between the object recognized in the first visible light image and an object associated with the near infrared light image.

Example 2 is the computer-vision system of example 1, further including a near infrared light camera to capture the near infrared light image.

Example 3 is the computer-vision system of example 1 or example 2, further including a visible light camera to capture a second visible light image, wherein the object recognizer is to recognize an object in the second visible light image.

Example 4 is the computer-vision system of any of example 1 to example 3, wherein the image converter includes a first neural network, and the object recognizer includes a second neural network.

Example 5 is the computer-vision system of example 4, wherein the first neural network includes a deep convolutional neural network based on an encoder—generator model.

Example 6 is a method that includes:

converting, with a first machine learning engine, a first image having a first format to form a second image having a second format;

recognizing an object in the second image; and updating the first machine learning engine based on a difference between the object recognized in the second image and an object associated with the first image.

Example 7 is the method of example 6, further including:

converting, with the first machine learning engine, a first plurality of images for training object recognition to form a second plurality of images for object recognition training, the first plurality of images having the first format, the second plurality of images having the second format; and training an object recognizer using the second plurality of object recognition training images.

Example 8 is the method of example 6 or example 7, wherein the first machine learning network includes a deep convolutional neural network.

Example 9 is the method of any of example 6 to example 8, wherein the recognizing the object in the second image includes processing the second image with a second machine learning engine.

Example 10 is the method of example 9, further including updating the second machine learning engine based on the difference.

Example 11 is the method of example 9, wherein the second machine learning engine includes a publicly-available object recognizer.

Example 12 is the method of example 9, wherein the second machine learning engine includes a deep convolutional neural network.

Example 13 is the method of example 9, wherein the second machine learning engine includes the GoogLeNet network.

Example 14 is the method of any of example 6 to example 13, wherein the first image is a near infrared (NIR) image, and the second image is a visible light image.

Example 15 is the method of example 14, wherein the second format includes a red, green and blue (RGB) color model.

Example 16 is a non-transitory computer-readable storage medium comprising instructions that, when executed, cause a computer processor to perform the method of any of example 6 to example 15.

Example 17 is a non-transitory computer-readable storage medium comprising instructions that, when executed, cause a machine to perform operations including:

converting, with a first machine learning engine, a first image having a first format to form a second image having a second format;

recognizing an object in the second image; and updating the first machine learning engine based on a difference between the object recognized in the second image and an object associated with the first image.

Example 18 is a non-transitory computer-readable storage medium of example 17, wherein the operations further include:

converting, with the first machine learning engine, a first plurality of images for training object recognition to form a second plurality of images for object recognition training, the first plurality of images having the first format, the second plurality of images having the second format; and training an object recognizer using the second plurality of object recognition training images.

Example 19 is a non-transitory computer-readable storage medium of example 17 or example 18, wherein the first machine learning network includes a deep convolutional neural network.

Example 20 is a non-transitory computer-readable storage medium of any of example 17 to example 19, wherein the recognizing the object in the second image includes processing the second image with a second machine learning engine.

Example 21 is a non-transitory computer-readable storage medium of any of example 17 to example 20, wherein the second machine learning engine includes a publicly-available object recognizer.

Example 22 is a system that includes:

means for converting a near infrared light first image to form a visible light image, and to update a coefficient of the image converter based on a difference;

means for recognizing an object in the first visible light image; and means for determining the difference between the object recognized in the first visible light image and an object associated with the near infrared light image.

Example 23 is the system of example [0064], further including a means for capturing the near infrared light image.

Example 24 is the system of example 22 or example 23, further including a means for capturing a second visible light image, wherein the means for recognizing is to recognize an object in the second visible light image.

Example 25 is the system of any of example 22 to example 24, wherein the means for converting includes a first neural network, and the means for recognizing includes a second neural network.

Example 26 is the system of example 25, wherein the first neural network includes a deep convolutional neural network based on an encoder—generator model.

"Including" and "comprising" (and all forms and tenses thereof) are used herein to be open ended terms. Thus, whenever a claim lists anything following any form of "include" or "comprise" (e.g., comprises, includes, comprising, including, having, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended. Conjunctions such as "and," "or," and "and/or" are inclusive unless the context clearly dictates otherwise. For example, "A and/or B" includes A alone, B alone, and A with B.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A computer-vision system, comprising:
   image converter circuitry to:
      convert a near infrared light first image to form a first visible light image;
   object recognizer circuitry to:
      determine a light level associated with the first visible light image; and
      in response to the light level satisfying a light condition threshold, recognize an object in the first visible light image; and
   object recognition analyzer circuitry to improve image conversion accuracy by determining the difference between the object recognized in the first visible light image and a target object associated with the near infrared light first image, the difference to be used to update a coefficient of the image converter circuitry to facilitate the improvement of the accuracy of image conversion.

2. The computer-vision system of claim 1, further including a near infrared light camera to capture the near infrared light first image.

3. The computer-vision system of claim 1, further including a visible light camera to capture a second visible light image, wherein the object recognizer circuitry is to recognize a second object in the second visible light image.

4. The computer-vision system of claim 1, wherein the image converter circuitry includes a first neural network, and the object recognizer circuitry includes a second neural network.

5. The computer-vision system of claim 4, wherein the first neural network includes a deep convolutional neural network based on an encoder—generator model.

6. A method, comprising:
   converting, by executing an instruction with processor circuitry, a first image having a first format to form a second image having a second format;
   determining, by executing an instruction with the processor circuitry, a light level of the first image;
   in response to the light level satisfying a light condition threshold, recognizing, by executing an instruction with the processor circuitry, an object in the first image; and
   improving image conversion accuracy by updating, by executing an instruction with the processor circuitry, a first machine learning engine based on a difference between the object recognized in the second image and a target object associated with the first image, the difference to be used to update a coefficient of the first machine learning engine to facilitate the improvement of the accuracy of image conversion.

7. The method of claim 6, further including:
   converting, with the first machine learning engine, a first plurality of images for training object recognition to form a second plurality of images for object recognition training, the first plurality of images having the first format, the second plurality of images having the second format; and
   training object recognizer circuitry using the second plurality of images.

8. The method of claim 6, wherein the first machine learning engine includes a deep convolutional neural network.

9. The method of claim 6, further including processing the second image with a second machine learning engine.

10. The method of claim 9, further including updating the second machine learning engine based on the difference.

11. The method of claim 9, wherein the second machine learning engine includes a publicly-available object recognizer.

12. The method of claim 9, wherein the second machine learning engine includes a deep convolutional neural network.

13. The method of claim 9, wherein the second machine learning engine includes the GoogLeNet network.

14. The method of claim 6, wherein the first image is a near infrared (NIR) image, and the second image is a visible light image.

15. The method of claim 14, wherein the second format includes a red, green and blue (RGB) color model.

16. A non-transitory computer-readable storage medium comprising instructions that, when executed, cause a machine to perform operations including:
   converting, with a first machine learning engine, a first image having a first format to form a second image having a second format;
   determining a light level associated with the first image;
   in response to the light level satisfying a light condition threshold, recognizing an object in the first image; and
   improving image conversion accuracy by updating the first machine learning engine based on a difference between the object recognized in the second image and a target object associated with the first image, the difference to be used to update a coefficient of the first machine learning engine to facilitate the improvement of the accuracy of image conversion.

17. The non-transitory computer-readable storage medium of claim 16, wherein the instructions, when executed, cause the machine to:

convert, with the first machine learning engine, a first plurality of images for training object recognition to form a second plurality of images for object recognition training, the first plurality of images having the first format, the second plurality of images having the second format; and train object recognizer circuitry using the second plurality of images.

18. The non-transitory computer-readable storage medium of claim 16, wherein the first machine learning engine includes a deep convolutional neural network.

19. The non-transitory computer-readable storage medium of claim 16, wherein the instructions, when executed, cause the machine to process the second image with a second machine learning engine.

20. The non-transitory computer-readable storage medium of claim 16, wherein the second machine learning engine includes publicly-available object recognizer circuitry.

21. A system, comprising:
means for converting to:
  convert a near infrared light first image to form a first visible light image;
means for recognizing to:
  determine a light level associated with the first visible light image;
  in response to the light level satisfying a light condition threshold, recognize an object in the first visible light image; and
means for improving image conversion accuracy by determining a difference between the object recognized in the first visible light image and a target object associated with the near infrared light first image, the difference to be used to update a coefficient of image converter circuitry to facilitate the improvement of the accuracy of image conversion.

22. The system of claim 21, further including means for capturing the near infrared light image.

23. The system of claim 21, further including means for capturing a second visible light image, wherein the recognizing means is to recognize an object in the second visible light image.

24. The system of claim 21, wherein the converting means includes a first neural network, and the recognizing means includes a second neural network.

25. The system of claim 24, wherein the first neural network includes a deep convolutional neural network based on an encoder—generator model.

* * * * *